(12) United States Patent
Kimura et al.

(10) Patent No.: US 7,718,023 B2
(45) Date of Patent: May 18, 2010

(54) VIBRATION WELDING APPARATUS AND WELDING METHOD

(75) Inventors: Masataka Kimura, Atsugi (JP); Daisuke Sengoku, Atsugi (JP)

(73) Assignee: Branson Ultrasonics Corp., Danbury, CT (US)

( * ) Notice: Subject to any disclaimer, the term of this patent is extended or adjusted under 35 U.S.C. 154(b) by 0 days.

(21) Appl. No.: 12/615,436

(22) Filed: Nov. 10, 2009

(65) Prior Publication Data

US 2010/0043943 A1 Feb. 25, 2010

Related U.S. Application Data

(62) Division of application No. 11/440,066, filed on May 25, 2006, now Pat. No. 7,637,300.

(51) Int. Cl.
*B32B 37/00* (2006.01)
(52) U.S. Cl. ................................ 156/73.5; 156/580
(58) Field of Classification Search ............... 156/64, 156/73.1, 73.5, 308.2, 580, 580.2
See application file for complete search history.

(56) References Cited

U.S. PATENT DOCUMENTS 4,776,905 A 10/1988 Cheung et al.
5,421,925 A 6/1995 Kulaszewicz et al.
6,730,182 B2 5/2004 Yamazaki et al.
6,797,089 B2 * 9/2004 Brahm et al. .............. 156/73.5

FOREIGN PATENT DOCUMENTS

JP  9-85833  A  3/1997
JP  9-151723 A  6/1997

* cited by examiner

*Primary Examiner*—James Sells
(74) *Attorney, Agent, or Firm*—Westerman, Hattori, Daniels & Adrian, LLP

(57) ABSTRACT

A vibration welding apparatus and a method for executing vibration welding of three or more work pieces made of a thermoplastic material to make them integral in a sandwich shape, comprises an upper tool means supporting a first work piece so as to apply a lateral motion to it by a vibration means, a lower tool means capable of supporting a plurality of second work pieces to be welded to at least both surfaces of the first work piece, and a means capable of actuating the lower tool means in such a manner as to move the second work pieces vertically by an elevating means so as to align with the first work piece, and move the second work pieces toward the first work piece laterally by a slide actuating means so as to bring them into contact with the first work piece.

2 Claims, 12 Drawing Sheets

VIBRATION WELDING APPARATUS AND WELDING METHOD

INCORPORATED-BY-REFERENCE TO RELATED APPLICATIONS

This application is a divisional application of U.S. Ser. No. 11/440,066, filed May 25, 2006, now U.S. Pat. No. 7,637,300, the entire contents of which is incorporated by reference.

TECHNICAL FIELD

The present invention relates to the field of vibration welding technology based on frictional heating, a result of applying a relative vibration (motion) to a plurality of work pieces made of thermoplastic material.

BACKGROUND ART

In the embodiment of the invention of Japanese Unexamined Patent Publication No. 9-85833 (Patent Document 1), there is disclosed a technology for executing a vibration welding process by bringing two work pieces made of a thermoplastic material into contact with each other in a face to face manner.

In the embodiment of the invention of Japanese Unexamined Patent Publication No. 9-151723 (Patent Document 2), there is disclosed a technology for executing vibration welding of two work pieces brought into contact with each other by a fixed side tool and a vibration side tool.

DISCLOSURE OF THE INVENTION

Problem to be Solved by the Invention

It is impossible to weld three or more work pieces to each other in a sandwich shape in a single weld, by the technologies disclosed in the documents 1 and 2 mentioned above.

The problem to be solved by the present invention exists as it is hard to develop a technology for integrally welding three or more work pieces in accordance with sequential working steps.

Further, the following problems typically occur while manufacturing this conventional thermoplastic product.

For example, a center console box (a storage box) arranged between a driver's seat and an assistant driver's seat in a motor vehicle is formed in a complicated shape, and a metal mold having a complicated shape is necessary for integrally molding it in a single piece, so that there is a risk that a molding defect of a finished product results.

Further, in a means for coupling a plurality of work pieces by screws or fasteners, not only is there a risk that the screw loosens due to vibrations, but also a manufacturing cost is increased. In addition, there is a risk of reduced strength or structural integrity.

With respect to the various problems mentioned above, the problem to be solved by the present invention is as follows.

A first object of the present invention is to provide a structure in which three or more work pieces made of thermoplastic material can be joined by vibration welding into an integral sandwich shape.

A second object of the present invention is to provide a structure in which three or more work pieces made of a thermoplastic material can be joined by vibration welding into a single assembly with superior strength.

A third object of the present invention is to provide a structure in which a finished product made of a thermoplastic material and having a complicated shape can be manufactured with high quality without causing manufacturing imperfections.

A fourth object of the present invention is to provide a structure in which the quality of a welded product can be improved by controlling relative motion and a range of fit into the lower tool receiving block so as to minimize variations in final height by a slide stabilizing means.

A fifth object of the present invention is to provide a structure in which quality of a welded product can be improved by controlling (adjusting) an elevation position of the lower tool block.

A sixth object of the present invention is to provide a structure in which a complicated and expensive metal mold is not required.

A seventh object of the present invention is to provide a structure in which a manufacturing labor can be reduced and waste can be effectively recycled without sorting at the time of disposal, because the work pieces can be integrally joined without fixing means made of a different material such as a metal screws or the like.

An eighth object of the present invention is to provide a structure for which manufacturing time can significantly reduced, because vibration welding of the work pieces can be executed in accordance with sequential manufacturing steps.

Means for Solving the Problems

The means for achieving the objects mentioned above are as follows.

(1) A vibration welding apparatus for accomplishing the vibration welding of three or more work pieces, made of a thermoplastic material, to make them integral, in a sandwich shape, comprising:

an upper tool means supporting a first work piece so as to apply a lateral vibratory motion to it by a vibration means; and a lower tool means capable of supporting a plurality of second work pieces to be welded to at least both surfaces of the first work piece, wherein the vibration welding apparatus is provided with a means capable of actuating the lower tool means in such a manner as to move the second work pieces in a height direction by an elevating means so as to align with the first work piece, and move the second work pieces toward the first work piece in a lateral direction by a slide actuating means so as to bring them into contact with the first work piece.

(2) A vibration welding apparatus as recited in the item (1) mentioned above, wherein the vibration welding apparatus is provided with a slide stabilizing means capable of synchronizing a relative movement in a lateral direction of right and left lower tool blocks.

(3) A vibration welding apparatus as recited in the item (1) mentioned above, wherein the vibration welding apparatus is provided with a slide stabilizing means capable of stabilizing a relative movement in a lateral direction of right and left lower tool blocks in a height direction.

(4) A vibration welding apparatus as recited in the item (1) mentioned above, wherein the vibration welding apparatus is provided with a distance sensor capable of controlling an interval between right and left lower tool blocks.

(5) A vibration welding apparatus as recited in the item (1) mentioned above, wherein the vibration welding apparatus is provided with an elevation control lever regulating a height position of an elevation frame and a frame mechanical stop.

(6) A vibration welding method for executing vibration welding of three or more work pieces made of a thermoplastic material to make them integral in a sandwich shape, comprising the following sequential steps of:

(A) a work piece installation step of installing a first work piece and at least a plurality of second work pieces to be welded to both side surfaces of the first work piece to an upper tool means and a plurality of lower tool means arranged apart from each other respectively;

(B) a work piece contact step of making a plurality of lower tool means ascend and moving them close to each other so as to pressure-contact the first work piece and the second work pieces;

(C) a vibration welding step of generating a frictional heating between the first work piece and the second work pieces pressure-contacted to the first work piece by applying a lateral motion so as to partly melt the work pieces, by the upper tool means; and (D) a work piece cooling step of stopping the lateral motion so as to execute natural cooling.

Effects of the Invention

Special effects of the present invention are as follows.

1. It is possible to execute vibration welding of at least three work pieces made of the thermoplastic material to make them integral in a sandwich shape.

2. The strength of the finished product, obtained by the vibration welding, is superior.

3. It is possible to obtain a finished product, having a high quality, without requiring a metal mold having a complicated shape.

4. Since the finished product does not include different materials such as a metal fastener, or the like, it is possible to dispose (recycle) without necessity of sorting for waste collection.

5. Since the manufacturing steps (sequence) can be reduced, productivity is improved.

PREFERRED EMBODIMENT OF THE INVENTION

A description will be given below of a best mode of the present invention with reference to FIGS. 1 to 11.

Figure 1:
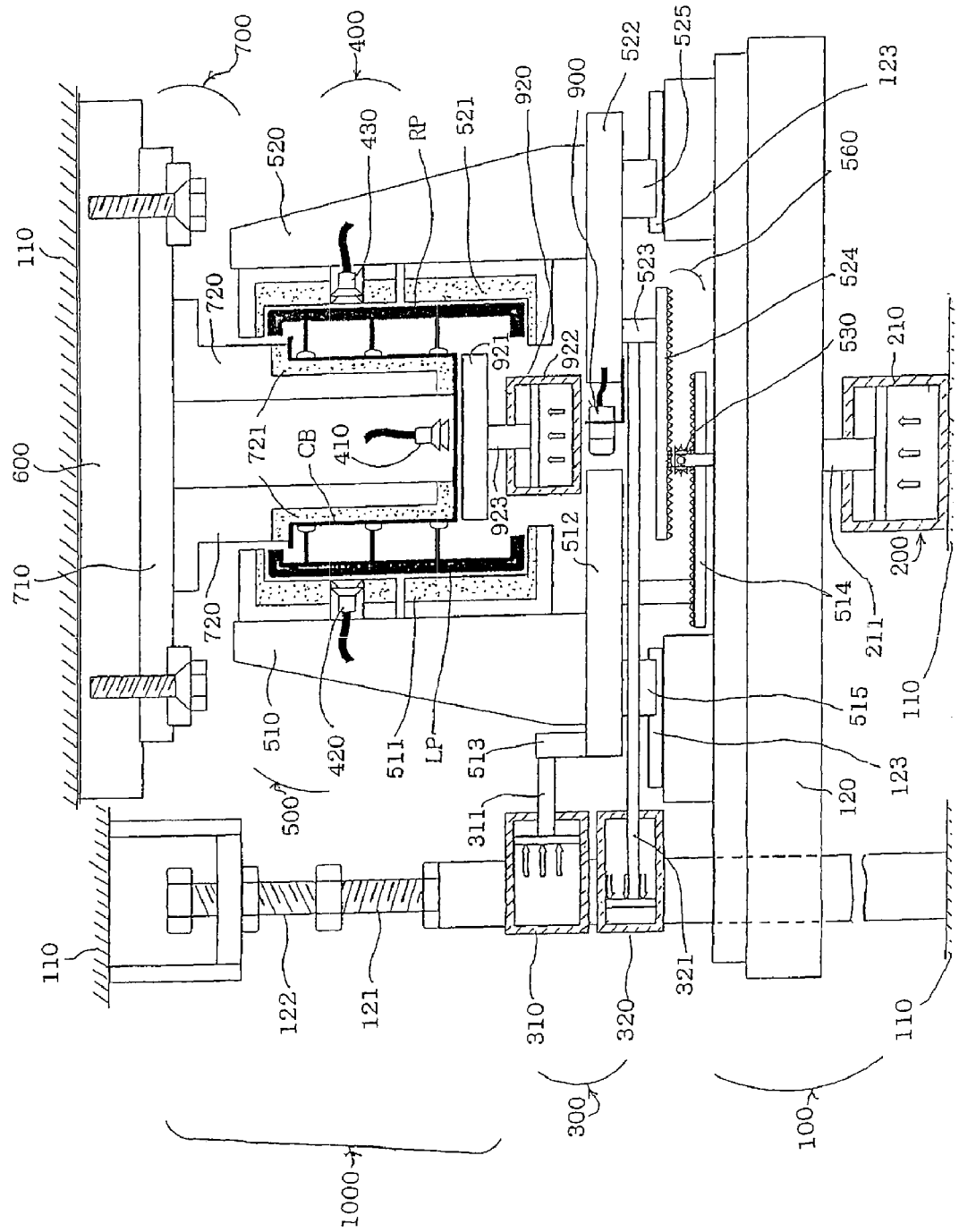
FIG. 1 is a side sectional view of a best mode in accordance with the present invention.

A vibration welding apparatus 1000 shown in FIG. 1 corresponds to a specific example forming a center partition cum storage device (a center console) arranged between a drive's seat and a assistant driver's seat in a motor vehicle, and has the following structure.

1. Summary of Vibration Welding Apparatus 1000

Various means mentioned below are arranged in a frame means 100 constituted by a fixed frame 110 and an elevation frame 120.

In particular, in the elevation frame 120 ascended and descended by a hydraulic actuation means 200, there is mounted a lower tool means 500 which is moved by a slide actuation means 300 and can hold a first work piece (a center box) by an adsorption means 400, and in the fixed frame 110, there is suspended an upper tool means 700 to which a lateral motion is applied by a vibration generating means 600 and which can hold a second work piece (right and left panels) by the adsorption means 400, wherein motions thereof are controlled by a control means 800 mentioned below.

2. Structure of each of Individual Means (1) Upper Tool Means 700

Figure 12:
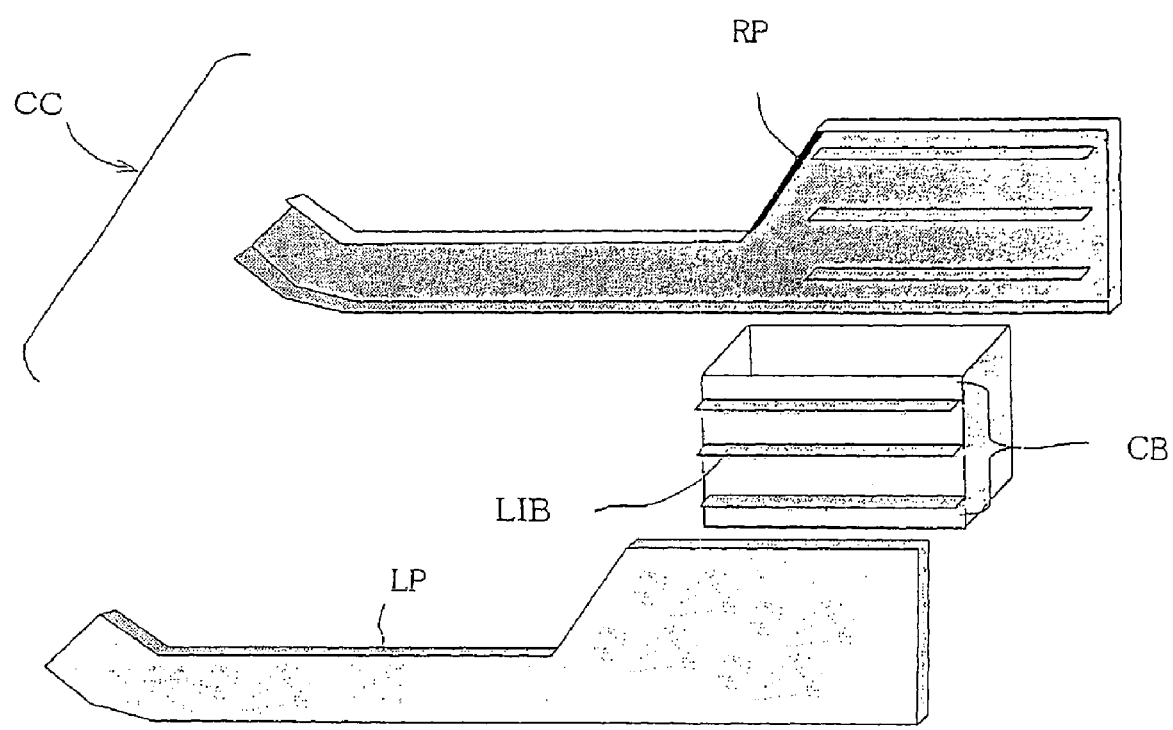
FIG. 12 is a perspective view of parts of the center console.

For executing vibration welding of a center box CB and left and right panels LP and RP constituting a center console CC as shown in FIG. 12, the upper tool means 700 holding the center box CB is provided with two upper tool receiving blocks 720 in a suspending manner under a lower surface of an upper tool plate 710 connected to the fixed frame 110, as shown in FIG. 1 so as to form a pair, an outer side of a lower portion thereof is lined with a first cushioning material 721 to be brought into contact with the center box CB, and the center box CB can be held by a box vacuum cup 410 of the adsorption means 400 being inserted into the center box CB.

Further, the structure is made such that a lateral motion is applied to the upper tool plate 710 from a vibration generation means (a vibrator) 600.

(2) Lower Tool Means 500

Left and right lower tool receiving blocks 510 and 520 arranged in a face to face manner in the lower tool means 500 are mounted on the elevation frame 120 so as to freely reciprocate in a lateral direction, are linearly moved close to each other and apart from each other by a slide actuation means 300 mentioned below, are provided with second and third cushioning pieces 511 and 521 on facing surfaces to support the left and right panels LP and RP constituting the center console CC, and can hold the left and right panels LP and RP in a face to face manner by left and right panel vacuum cups 420 and 430 of the adsorption means 400.

The slide actuation means 300 mentioned above is structured such that outer ends of piston rods 311 and 321 of first and second air cylinders 310 and 320 arranged on the elevation frame 120 are respectively coupled to left and right flanges 513 and 523 provided on base frames 512 and 522 of the left and right lower tool blocks 510 and 520 so as to protrude uprightly.

Further, the respective base frames 512 and 522 are continuously provided with a pair of racks 514 and 524 worked with a pinion 530, and are interposed with a slide stabilizing means 560 in which the sliders 515 and 525 protruded under the lower surfaces of the base frames 512 and 522 are engaged with rails 123 on the elevation frame 120.

A distance sensor 900 detecting an interval between the left and right lower tool receiving blocks 510 and 520 which are moved close to each other and apart from each other in accordance with the welding work, for example, such a sensor detecting a change of the distance on the basis of a change of an eddy current flowing through a metal surface, is provided between the left and right lower tool receiving blocks 510 and 520.

A drop prevention means 920 of the center box CB is structured such that a holding plate 921 for preventing the center box CB held by the upper tool receiving block 710 from disengaging and dropping is fixed to an upper end of a piston lever 923 of a fluid cylinder 922, and can stably hold the center box CB at a time of a welding process.

(3) Hydraulic Elevating Means 200

The elevation frame 120 is coupled to the piston lever 211 of the hydraulic cylinder 210, is structured such as to make the lower tool means 500 ascend and descend at a time of the welding process, and is structured such that the elevation control lever 121 connected to the elevation frame 120 hits against the frame stopper 122 on the fixed frame 110, thereby regulating a height position of the elevation frame 120 and improving a safety.

(4) Control Means 800

Figure 2:
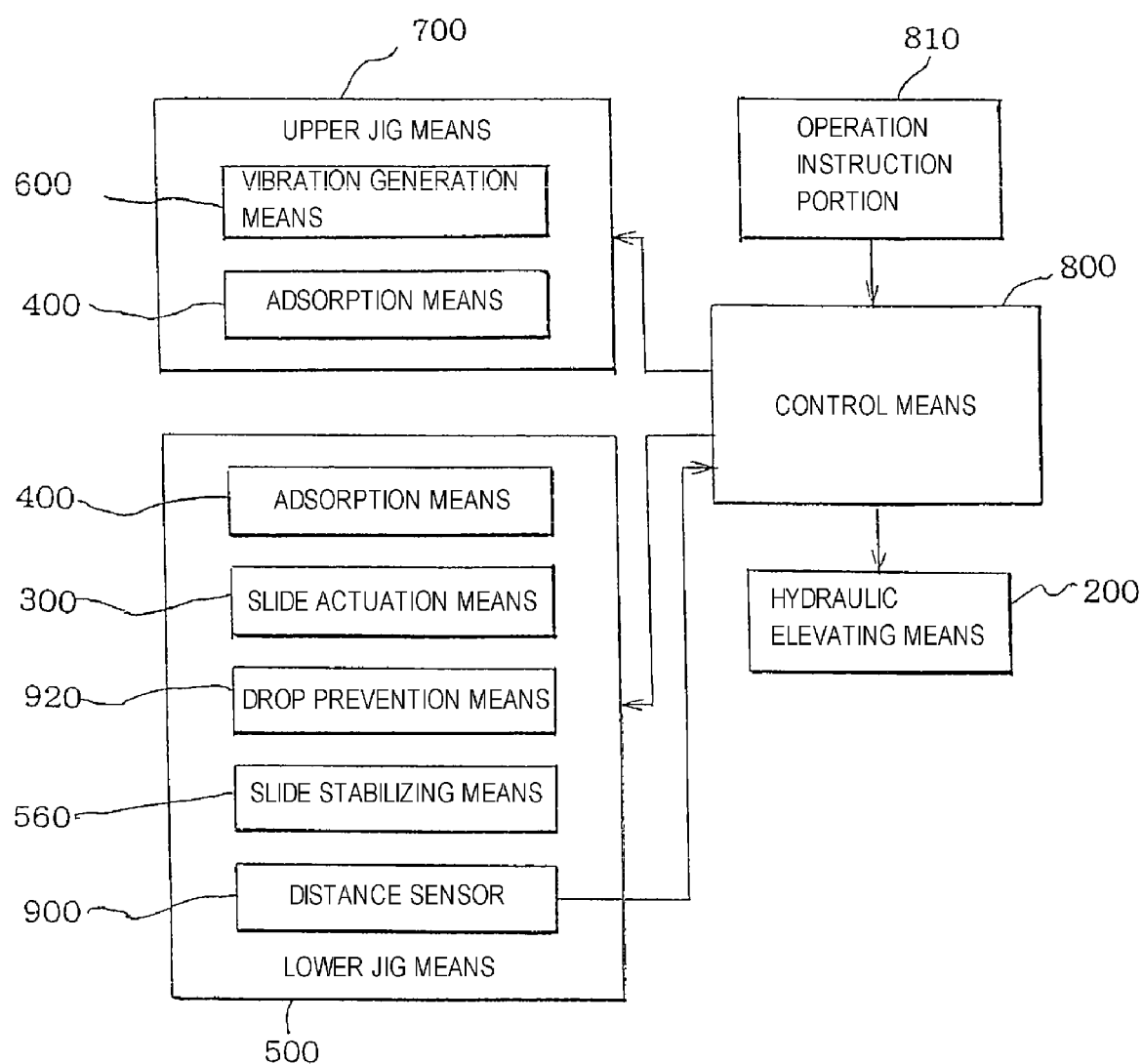
FIG. 2 is a functional block diagram of FIG. 1.

The control means 800 constituting a C.P.U is wired as shown in FIG. 2, and can precisely actuate and stop each of the means in correspondence to a command from an operation instruction portion 810.

In particular, the hydraulic actuating means 200 is actuated by the control means 800, thereby controlling the elevation frame 120 so as to ascend and descend, holding the center box CB to the upper tool receiving block 720 by the adsorption means 400 and holding the left and right panels LP and RP to the left and right lower tool receiving blocks 510 and 520, respectively.

Further, the center box CB and the left and right panels LP and RP can be pressure-contacted by moving the left and right lower tool receiving blocks 510 and 520 by the slide actuation means 300, and the vibration welding process can be executed by the vibration generation means 600. The interval between the left and right lower tool receiving blocks 510 and 520 can be controlled by the distance sensor 900 for stabilizing the welding process, and the height of the elevation frame 120 can be safely controlled by the frame stopper 122.

Further, the center box CB can be stably held by controlling the drop preventing means 920.

3. Work Piece

Three work pieces constituting the center console shown in FIG. 12 are all made of a thermoplastic material such as an ABS resin or a PP material.

The center box CB positioned in the center and exposed to the vibration welding process is formed in a box shape.

Welding ribs LIB inwardly protruding toward the center box CB are formed in a laterally parallel shape on the left and right panels LP and RP positioned in both sides of the center box CB and welded to the center box CB in a sandwich shape by the vibration welding.

4. Vibration Welding Method

A description will be given below of a welding method by the vibration welding apparatus 1000 mentioned above for each of the steps on the basis of FIGS. 3 to 11.

(1) Preceding Step

Figure 3:
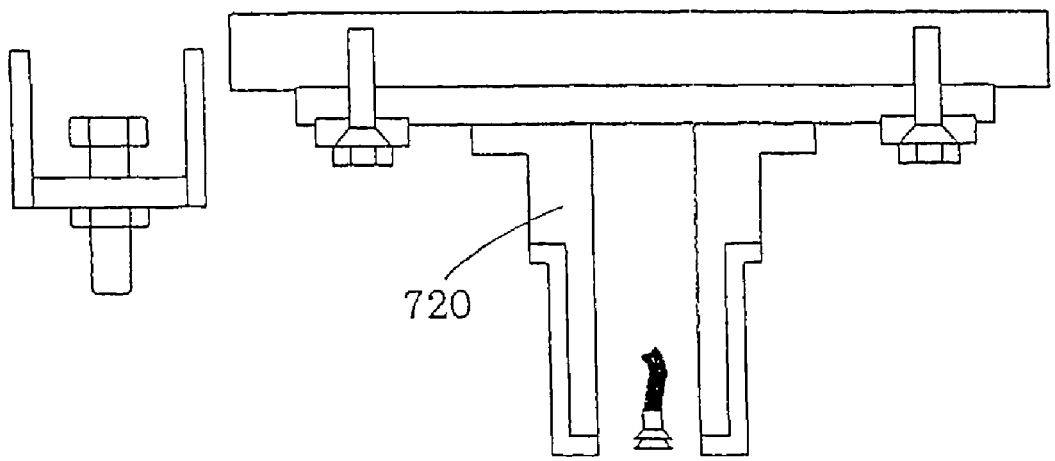
FIG. 3 is a view of a preceding step.
Figure 3:
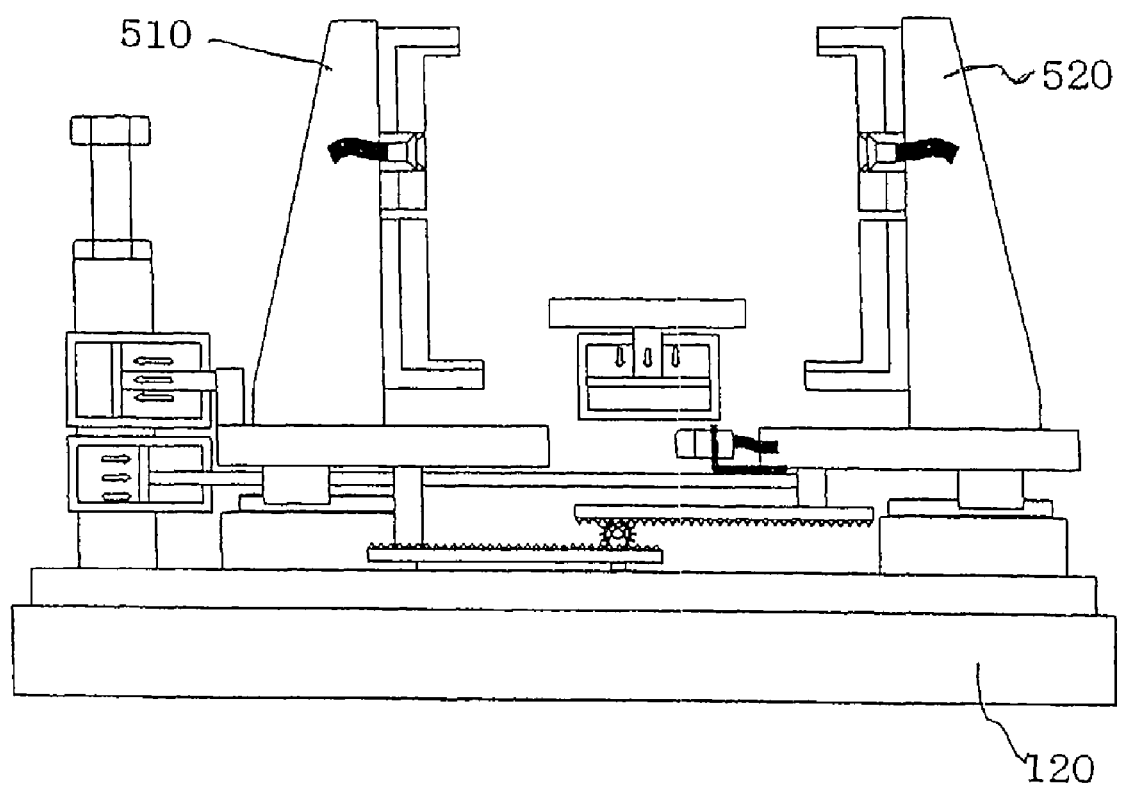

As shown in FIG. 3, the elevation frame 120 is at a descent position, the left and right lower tool receiving blocks 510 and 520 are arranged apart from each other, and the upper tool receiving block 720 is arranged apart from and above them, whereby a standby state is achieved.

(2) Work Setting Step

Figure 4:
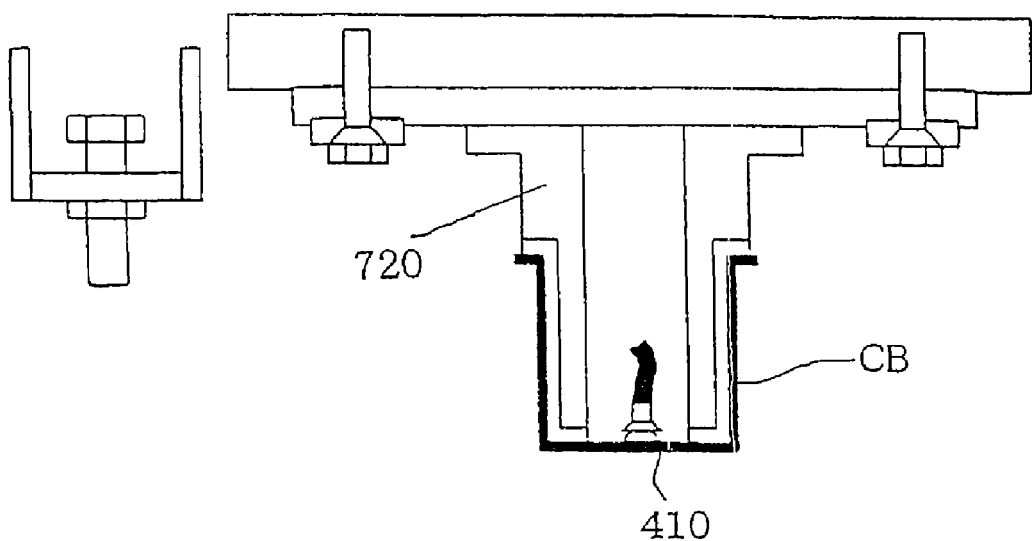
FIG. 4 is a view of a work setting step.
Figure 4:
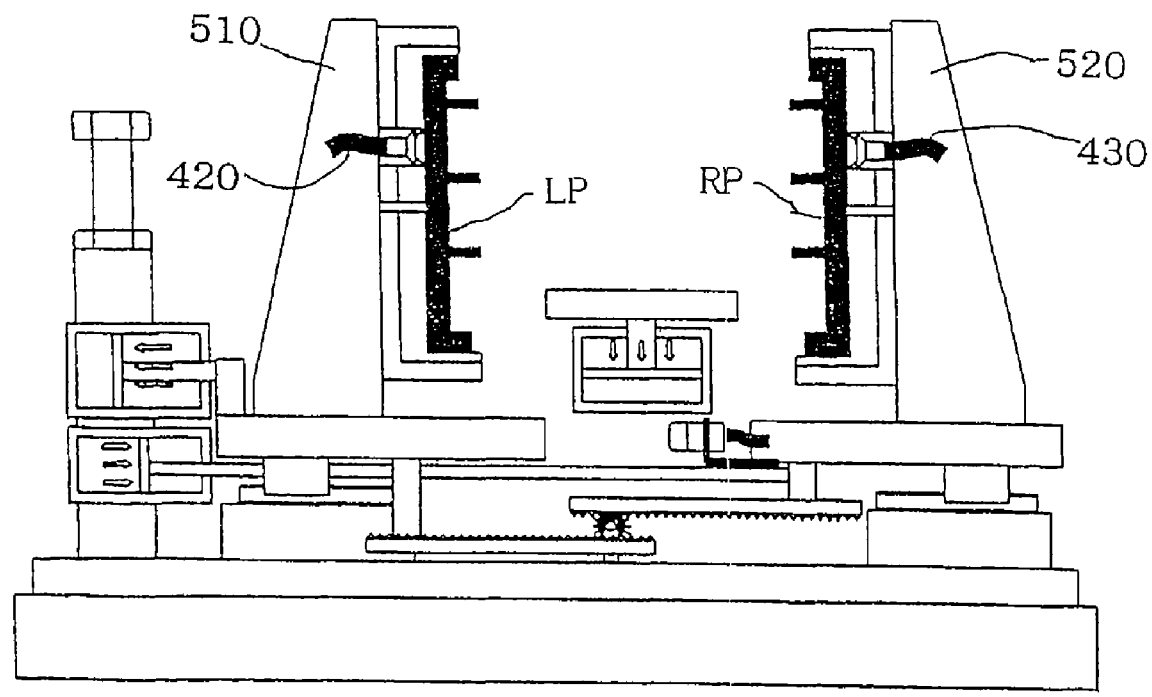

As shown in FIG. 4, the center box CB corresponding to the work piece is fitted to the upper tool receiving block 720, the left and right panels LP and RP are inserted to the left and right tool receiving blocks 510 and 520, and the adsorption means 400 is started, whereby the center box CB and the left and right panels LP and RP are respectively adsorbed to the upper tool receiving block 720 and the left and right lower tool receiving blocks 510 and 520 by the box vacuum cup 410 and the left and right panel vacuum cups 420 and 430 respectively so as to be stably held.

(3) Lower Tool Means 500 Ascending Step

Figure 5:
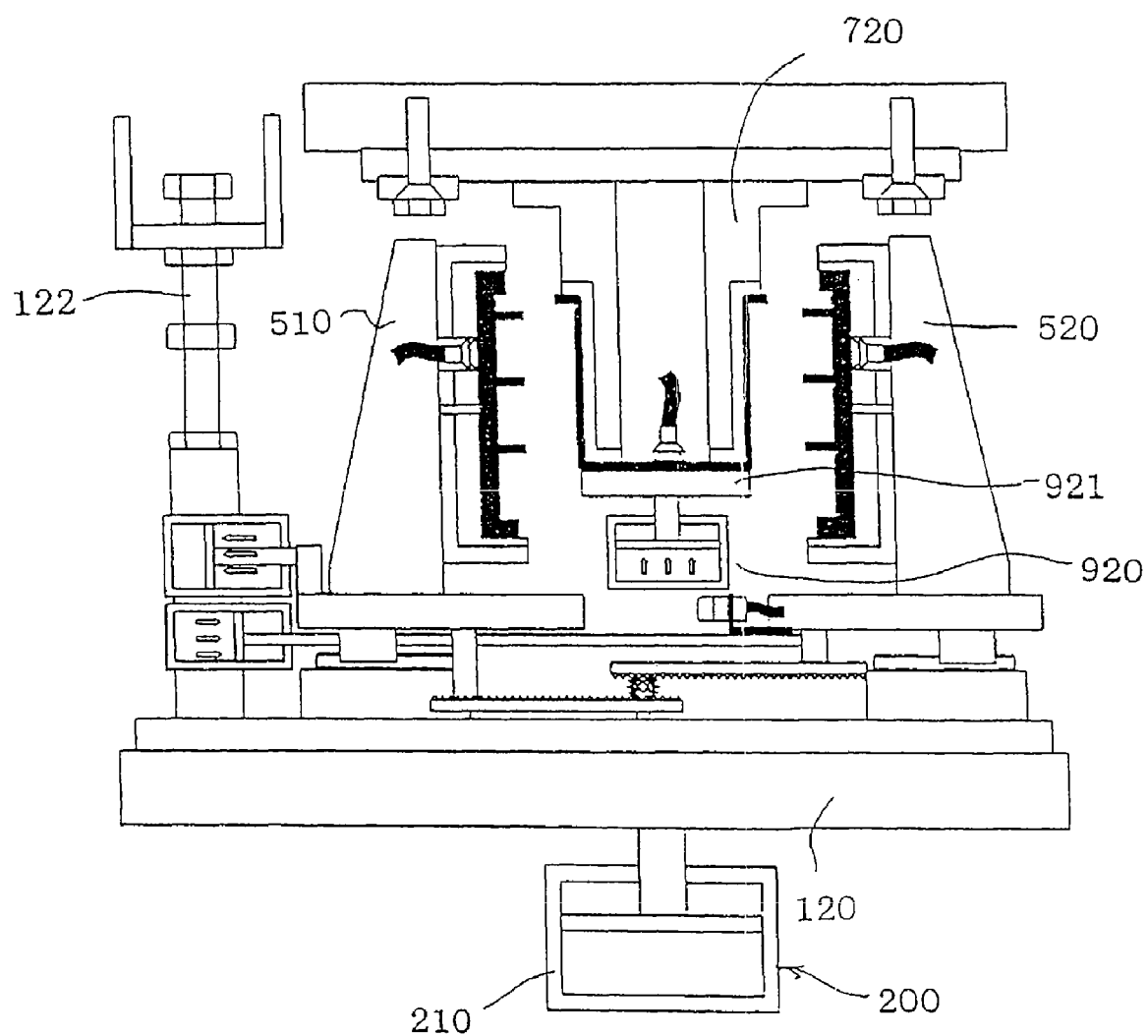
FIG. 5 is a view of a lower tool means ascending step.

As shown in FIG. 5, the hydraulic cylinder 210 is started, the lower tool means 500 is made to ascend together with the elevation frame 120, and the left and right panels LP and RP are arrived at a position properly facing the center box CB.

With respect to the ascending amount of the elevation frame 120 at this time, the elevation frame 120 can safely ascend until the elevation control lever 121 is constrained to the stop position by the frame stopper 122.

Further, the center box CB is supported from the lower surface and the drop can be previously prevented by ascending of the holding plate 921 coupled to the piston lever 923 of the hydraulic cylinder 922 of the drop prevention means 920.

(4) Work Pressure-Contact Step

Figure 6:
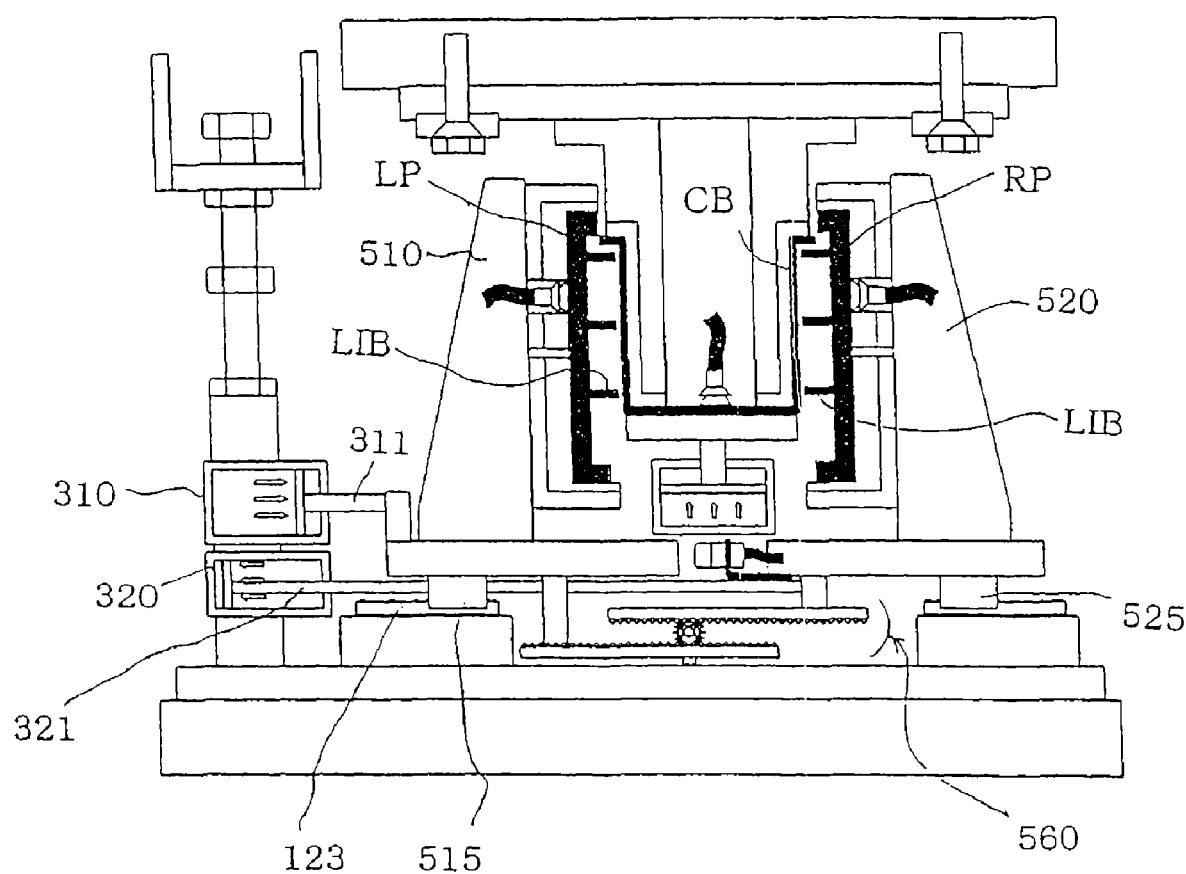
FIG. 6 is a view of a work pressure-contact step.

As shown in FIG. 6, the piston rods 311 and 321 of the first and second air cylinders 310 and 320 are actuated as shown by arrows, the left and right tool receiving blocks 510 and 520 are moved in a direction coming close to each other, and the center box CB is pinched in a sandwich shape by the left and right panels LP and RP, whereby the welding ribs LIB are set in a pressure-contact state.

At this time, since the slide stabilizing means 560 is interposed between each of the piston rods 311 and 321, the left and right tool receiving blocks 510 and 520 are moved at a same distance, and are stably maintained by the rails 123 and the sliders 515 ad 525.

(5) Vibration Welding Step

Figure 7:
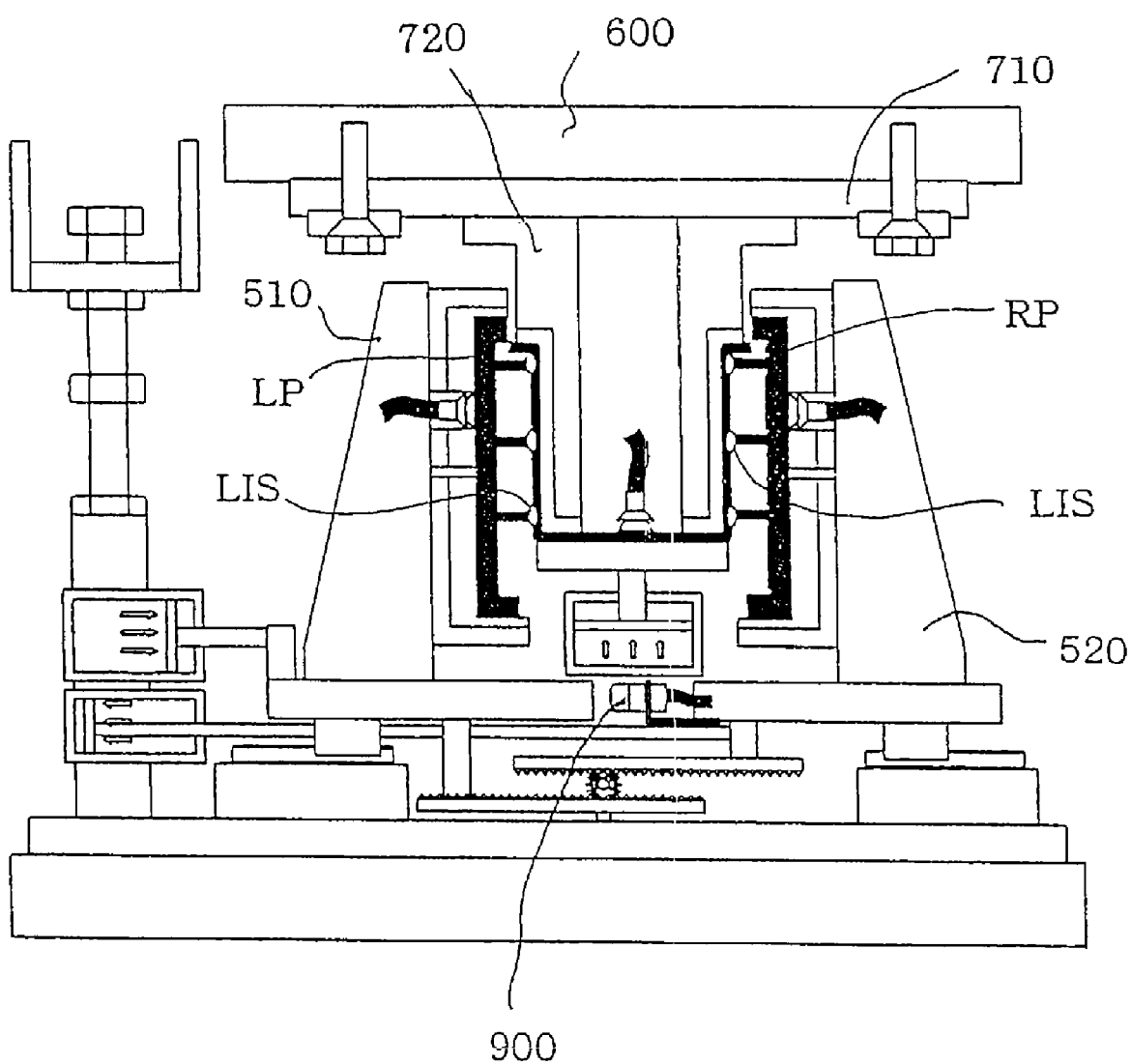
FIG. 7 is a view of the vibration welding step.

As shown in FIG. 7, a lateral motion in a direction orthogonal to the paper surface is applied to the upper tool receiving block 720 from a vibrator 600 coupled to the upper tool plate 710, a frictional heating is generated between the welding ribs LIB of the left and right panels LP and RP and the center box CB, and leading ends of the welding ribs LIB are melted, whereby the left and right panels LP and RP and the center box CB are welded.

During the work, the first and second air cylinders 310 and 320 are additionally actuated while detecting the distance of a melted portion corresponding to a melt margin of the welding rib LIB by the distance sensor 900, and the welding process is promoted by bringing the left and right lower tool receiving blocks 510 and 520 closer slightly (about 3 mm).

(6) Cooling Step

In a state of the step (5) mentioned above, the vibrator 600 is stopped by a control means on the basis of the signal of the distance sensor 900, and the position is held for a short moment (about 3 seconds) to remain ready for cooling and hardening.

(7) Drop Prevention Means 920 Retracting Step

Figure 8:
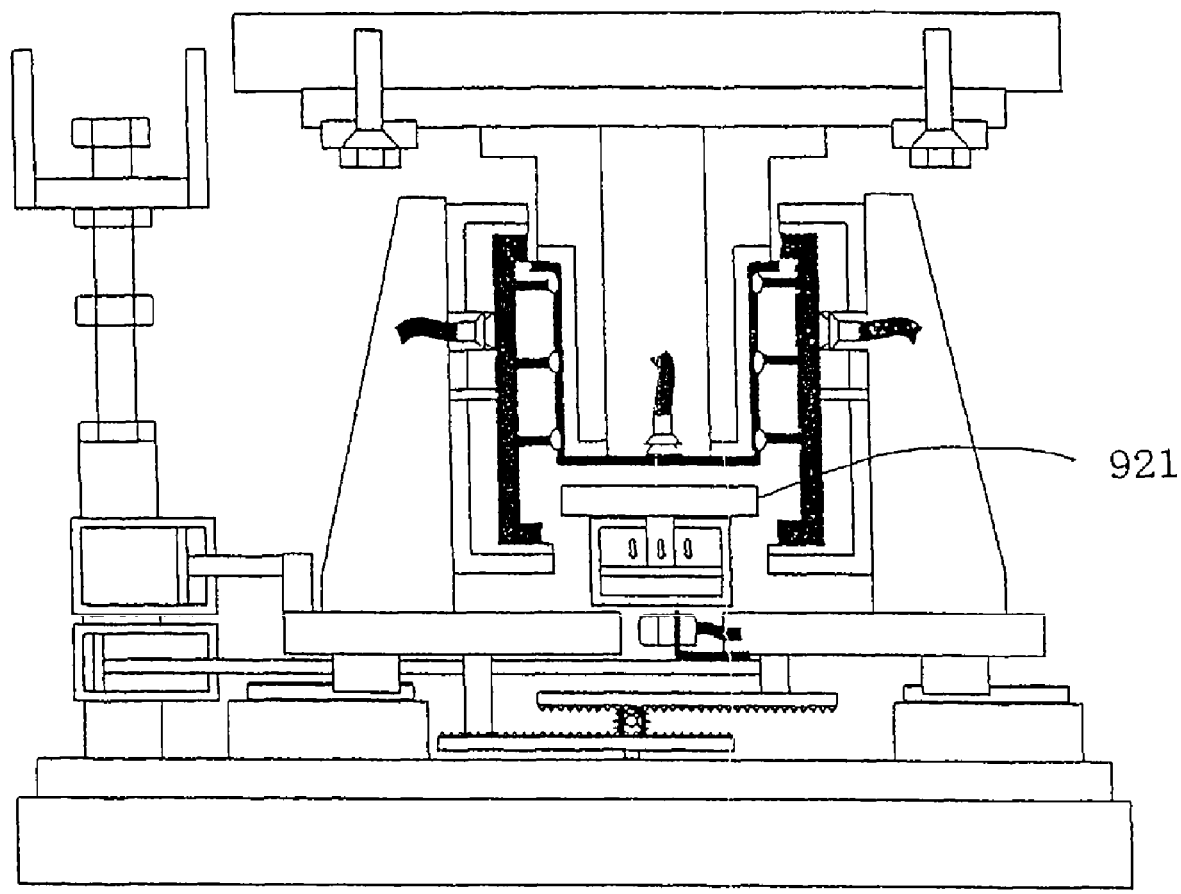
FIG. 8 is a view of a drop prevention means retracing step.

As shown by an arrow in FIG. 8, the holding plate 921 is made to descend so as to be isolated from the lower surface of the center box CB.

(8) Center Box CB Releasing Step

Figure 9:
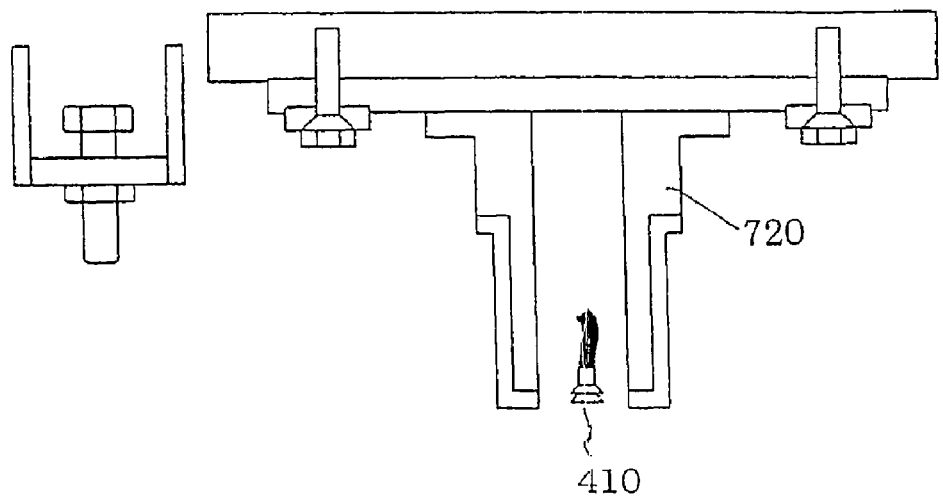
FIG. 9 is a view of a center box releasing step.
Figure 9:
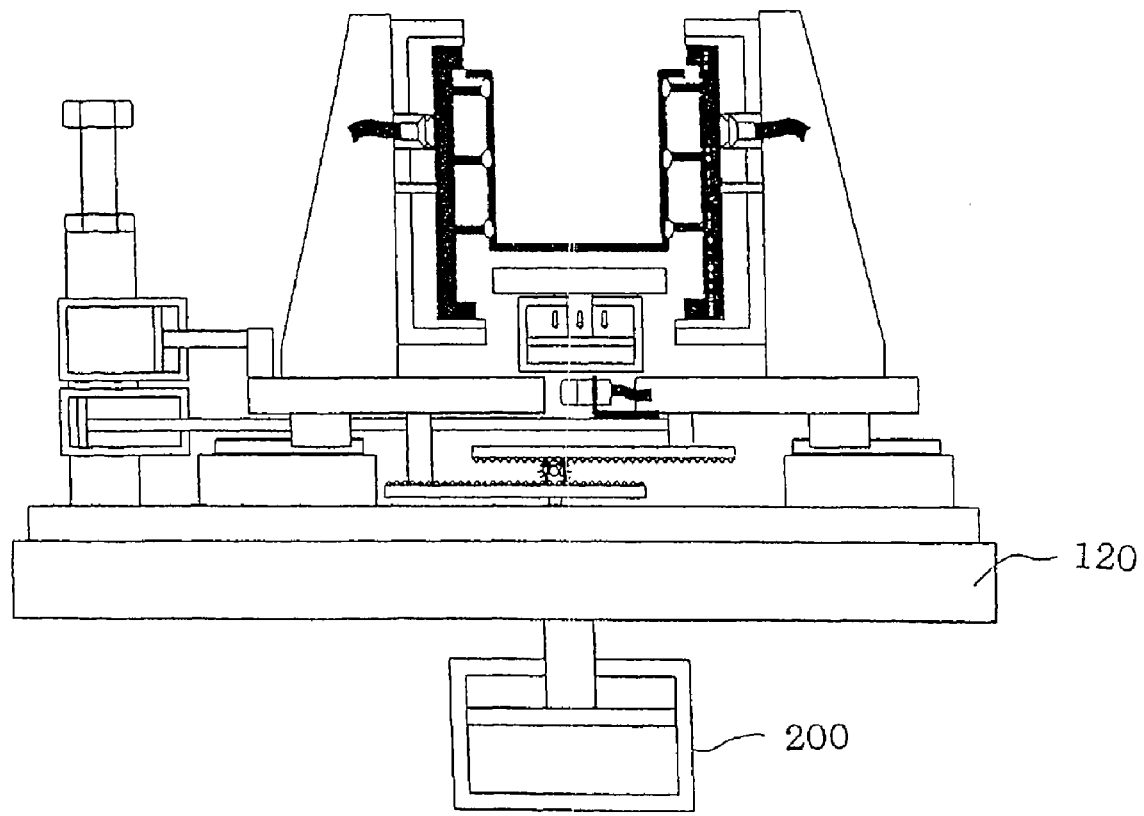

As shown in FIG. 9, the operation of the box vacuum cup 410 of the adsorption means 400 is stopped, and the elevation frame 120 is made to descend, whereby the upper tool receiving block 720 is released from the center box.

(9) Left and Right Panels LP and RP Releasing Step

Figure 10:
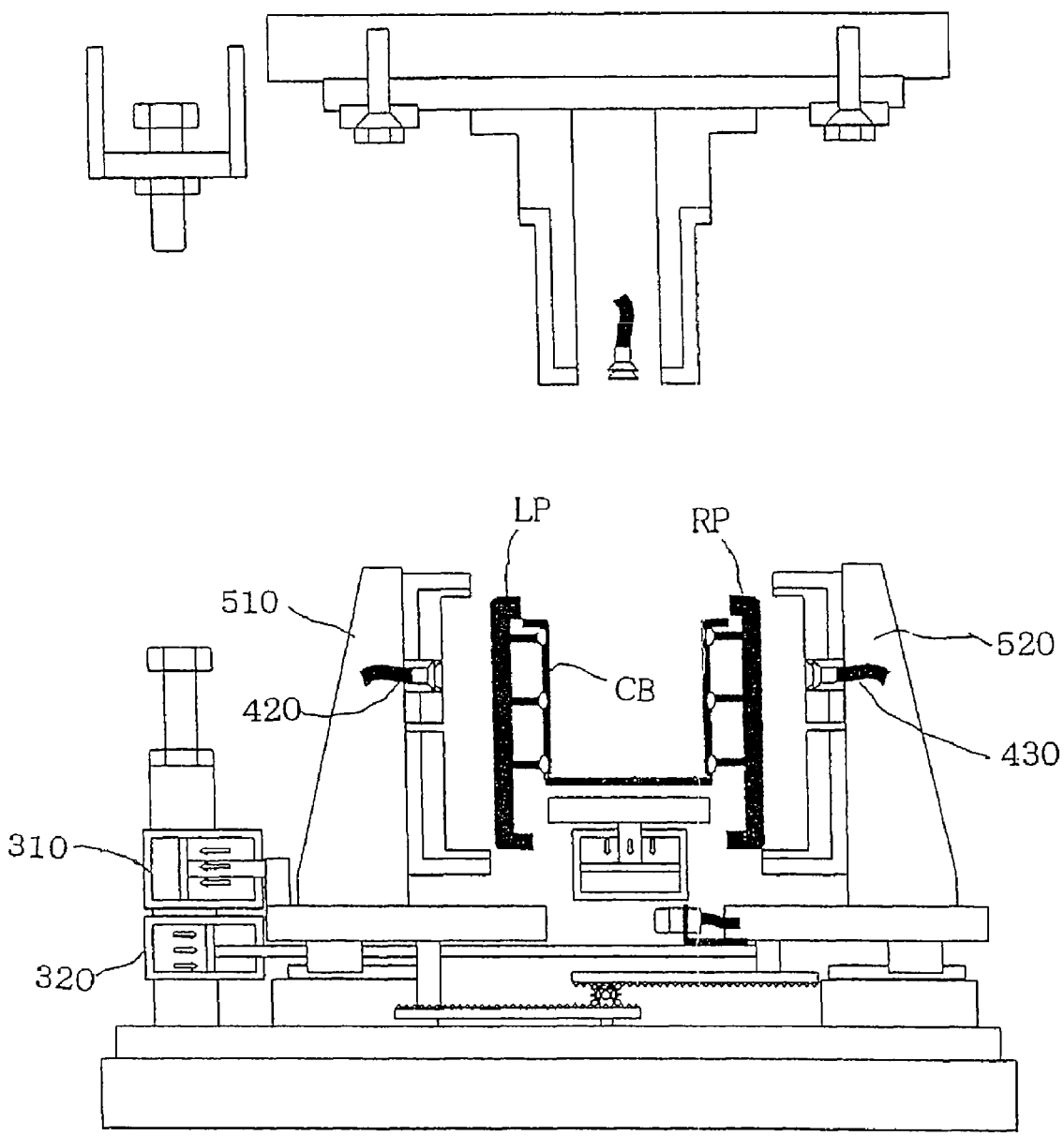
FIG. 10 is a view of a right and left panels releasing step.

As shown in FIG. 10, the operation of the left and right panel vacuum cups 420 and 430 of the adsorption means 400 is stopped, and the first and second air cylinders 310 and 320 are moved reverse in directions of arrows, whereby the left and right panels LP and RP are released from the left and right lower tool receiving blocks 510 and 520.

(10) Center Console CC Unloading Step

Figure 11:
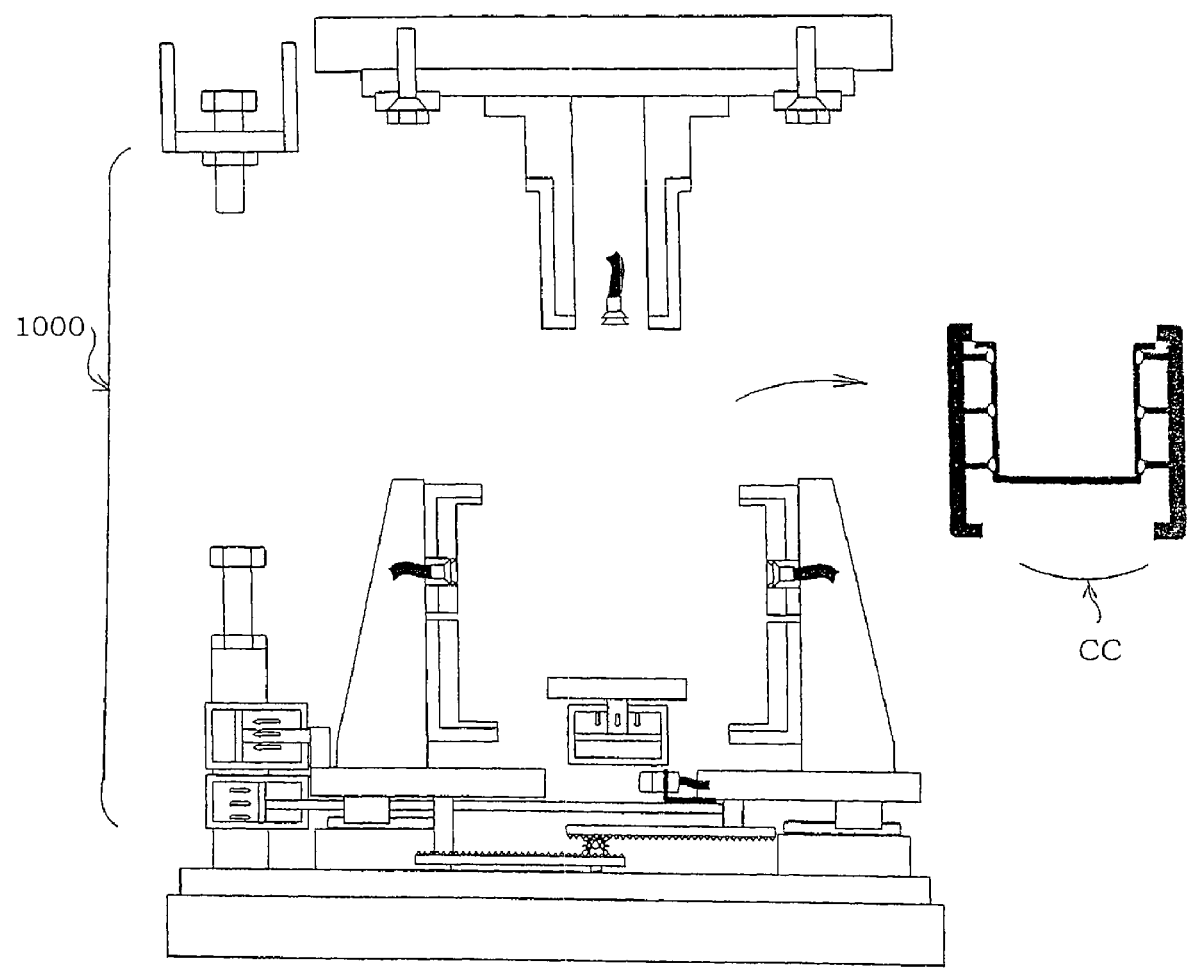
FIG. 11 is a view of a center console unloading step.

As shown in FIG. 11, the center console CC formed by the steps mentioned above is unloaded from the vibration welding apparatus 1000, and all the steps are finished.

Embodiment

An embodiment of the vibration welding work is as follows.

1. Lateral motion frequency l... 100 Hz to 240 Hz

2. Pressure applied to work piece ... about 50 to 1000 kg

3. Melt margin ... about 3 mm

4. Welding time ... about 3 sec

5. Cooling time ... about 3 sec

The work piece is as follows.

1. Raw Material

ABS resin, acrylic resin, polycarbonate, polyethylene, polypropylene.

2. Dimension

Thickness of center box ... about 2 to 5 mm
Thickness of left and right panels ... about 2 to 5 mm

INDUSTRIAL APPLICABILITY

In accordance with the present invention, it is possible to shorten a manufacturing process so as to obtain a finished product having a complicated shape and made of a thermoplastic material, it is possible to make the finished product as compact as possible, and the rigidity thereof can be increased. Accordingly, the present invention has an extremely great industrial applicability in view of applicability to various plastic products.

What is claimed is:

1. A vibration welding method for executing vibration welding of at least a first work piece and a plurality of second work pieces made of a thermoplastic material to make said first work piece and said plurality of second work pieces integral in a sandwich shape, comprising:

installing said first work piece to an upper tool and installing said plurality of second work pieces to a plurality of lower tools arranged apart from each other, then moving said plurality of lower tools towards each other in opposite directions such that said plurality of second work pieces pressure-contact said first work piece, and then generating a frictional heating between said first work piece and said plurality of second work pieces by laterally moving said upper tool, thus vibration welding said first work piece and said plurality of second work pieces by partial melting.

2. The method of claim 1, further comprising naturally cooling said first work piece and said plurality of second work pieces by stopping lateral movement of said upper tool.

* * * * *